(12) United States Patent
Shimono

(10) Patent No.: US 6,771,265 B1
(45) Date of Patent: *Aug. 3, 2004

(54) COMPUTER-READABLE RECORDING MEDIUM STORING A PROGRAM FOR 3-D COMPUTER IMAGE PROCESSING, METHOD OF DEPICTING SHADOW, AND VIDEO GAME APPARATUS

(75) Inventor: Toshinori Shimono, Tokyo (JP)

(73) Assignee: Kabushiki Kaisha Square Enix, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/536,753

(22) Filed: Mar. 28, 2000

(30) Foreign Application Priority Data

Dec. 28, 1999 (JP) .......................................... 11-375421

(51) Int. Cl.⁷ .............................................. G06T 15/60
(52) U.S. Cl. ...................................................... 345/426
(58) Field of Search ................................. 345/419, 420, 345/421, 426, 428; 382/203, 174, 274

(56) References Cited

U.S. PATENT DOCUMENTS 6,342,882 B1   1/2002   Oka

FOREIGN PATENT DOCUMENTS

| JP | 8-249479  | 9/1996 |
| JP | 9-47576   | 2/1997 |
| JP | 10-11610  | 1/1998 |
| JP | 10208025  | 8/1998 |
| JP | 10208067  | 8/1998 |
| JP | 10214353  | 8/1998 |
| JP | 2774795   | 9/1998 |
| JP | 11-53573  | 2/1999 |
| JP | 11-53580  | 2/1999 |
| JP | 11-66340  | 3/1999 |
| JP | 11102179  | 4/1999 |

*Primary Examiner*—Mark Zimmerman
*Assistant Examiner*—Enrique L Santiago
(74) *Attorney, Agent, or Firm*—Greenblum & Bernstein, P.L.C.

(57) ABSTRACT

The present invention permits realistic drawing of a natural shadow image, even when shadow images overlap each other on a background image, while preventing the shadow image from becoming darker in the superimposed area than in the other areas or preventing a decrease in the degree of translucence. The invention imparts a shadow object to each solid model to be drawn, determines whether shadow objects are superimposed from the positional relationship of the shadow objects imparted to the solid models to be drawn, and for an area where shadow objects are determined to be superimposed, the drawing process is executed by displaying only one of the superimposed shadow objects.

7 Claims, 11 Drawing Sheets

FIG. 2

| OBJECT ID NO. | POLYGON ID NO. | VERTEX ID NO. |
|---|---|---|
| M1 | P1 | V1 |
| | | V2 |
| | | V3 |
| | P2 | V3 |
| | | V2 |
| | | V4 |
| | P3 | V4 |
| | | V6 |
| | | V3 |
| | ⋮ | ⋮ |
| ⋮ | ⋮ | ⋮ |

| OBJECT ID NO. | VERTEX ID NO. | COORDINATES DATA |
|---|---|---|
| M1 | V1 | (X1,Y1,Z1) |
|  | V2 | (X2,Y2,Z2) |
|  | V3 | (X3,Y3,Z3) |
|  | V4 | (X4,Y4,Z4) |
|  | V5 | (X5,Y5,Z5) |
|  | ⋮ | ⋮ |
| ⋮ | ⋮ | ⋮ |

| SHADOW POLYGON ID NO. | VERTEX ID NO. | COORDINATES DATA | $\alpha$-VALUE |
|---|---|---|---|
| SP1 | SV1 | (X1,Y1,Z1) | 40h |
|  | SV2 | (X2,Y2,Z2) |  |
|  | SV3 | (X3,Y3,Z3) |  |

1024 x 512 PIXELS

COMPUTER-READABLE RECORDING MEDIUM STORING A PROGRAM FOR 3-D COMPUTER IMAGE PROCESSING, METHOD OF DEPICTING SHADOW, AND VIDEO GAME APPARATUS

BACKGROUND OF THE INVENTION

1. Field of the Invention

The present invention relates to a computer-readable recording medium storing a shadow depicting program in 3-D computer image processing, a method of depicting a shadow, and a video game apparatus.

2. Description of the Related Art

For a 3-D computer image in a video game or the like, it is conventionally proposed to impart a shadow to a solid model drawn in a virtual 3-D space on a monitor screen, such as a game character comprising polygons to display the shadow of the game character. An image processing technique of this kind is disclosed in Japanese Unexamined Patent Publications No.9-47576 or No. 10-232943.

A shadow is imparted to a polygon model by perspectively transforming and projecting each polygon onto a projected plane and superimposing a shadow image for each polygon over background images such as the ground and floors.

When there are multiple solid models or polygons, shadow images of the solid models or polygons may sometimes overlap each other on the background image. When a shadow object is displayed with a translucent image, it is doubly translucent-treated in the area where the shadow images overlap, thus resulting in a lower transparency of the area where the shadow images overlap. This leads to a non-uniform transparency of the translucent shadow image and hence to an unnatural image display.

For example, for a game character 210 displayed on a display screen 200 as shown in FIG. 15, there occurs an area where the shadow of a polygon in front of the left leg of the game character 210 overlap the shadow of the right leg. The shadow depth in this superimposed area becomes higher than in the other areas, resulting in an unnatural image display.

SUMMARY OF THE INVENTION

The present invention solves the above-mentioned problems and has an object to provide a computer-readable recording medium storing a shadow depicting program in 3-D computer image processing, a shadow depicting method and a video game apparatus in which, even when shadow images overlap each other on background images, the shadow images in a superimposed area is prevented from becoming thicker than in the other areas, and which permits easy drawing of a realistic natural shadow image.

To achieve the aforementioned object, the present invention provides a computer-readable recording medium storing a program for 3-D computer image processing which displays a shadow of a solid model drawn in a virtual 3-D space of a monitor screen as a shadow object, wherein the medium storing a program which causes a computer to impart a shadow object to each of the solid models to be drawn; determines whether or not there are superimposed shadow objects from the positional relationship between shadow objects imparted to the solid models to be drawn; and conducts drawing processing, for an area where there are superimposed shadow objects, which displays only one shadow object from among the superimposed shadow objects.

In the recording medium of the invention, the determination of the superimposed shadow objects may comprise the steps of setting a flag showing the presence of shadow objects in correlation with the displayed positions of the shadow objects, and determining superimposition of the shadow objects with reference to the flag, or further, may comprise the step of setting the flag for each pixel.

The recording medium of the invention may display the shadow objects in a translucent manner.

To achieve the aforementioned object of the invention, there is provided a method of depicting a shadow in 3-D computer image processing which displays a shadow of a solid model drawn in a virtual 3-D space of a monitor screen as a shadow object. The method comprises the steps of imparting a shadow object to each of the solid models to be drawn; determining whether or not there are superimposed shadow objects from the positional relationship between shadow objects imparted to the solid models to be drawn; and conducting drawing processing, for an area where there are superimposed shadow objects, which displays only one shadow object from among the superimposed shadow objects.

In the method of depicting a shadow in 3-D computer image processing according to the invention, the determination of the superimposed shadow objects may comprise the steps of setting a flag showing the presence of shadow objects in correlation with the displayed positions of the shadow objects, and determining superimposition of the shadow objects with reference to the flag, or may comprise the step of setting the flag for each pixel.

In the method of depicting a shadow in 3-D computer image processing according to the invention, the shadow objects may be displayed in a translucent manner.

The video game apparatus of the invention comprises a computer controlling a game; and a recording medium storing a program which causes the computer to control the game; the program causing the computer to impart a shadow object to each of the solid models to be drawn; determine whether or not there are superimposed shadow objects from the positional relationship between shadow objects imparted to the solid models to be drawn; and conduct drawing processing, for an area where there are superimposed shadow objects, which display only one shadow object from among the superimposed shadow objects.

The present disclosure relates to subject matter contained in priority Japanese Patent Application No. HEI 11-375421, filed on Dec. 28, 1999, the contents of which is herein expressly incorporated by reference in its entirety.

BRIEF DESCRIPTION OF THE DRAWINGS

FIG. 2 is a descriptive view illustrating a typical configuration of the polygon table;

FIG. 3 is a descriptive view illustrating a typical configuration of the polygon vertex table;

FIG. 4 is a descriptive view illustrating a typical configuration of the shadow polygon data;

DESCRIPTION OF THE PREFERRED EMBODIMENTS

Embodiments of the invention will be described in detail with reference to the attached drawings.

Figure 1:
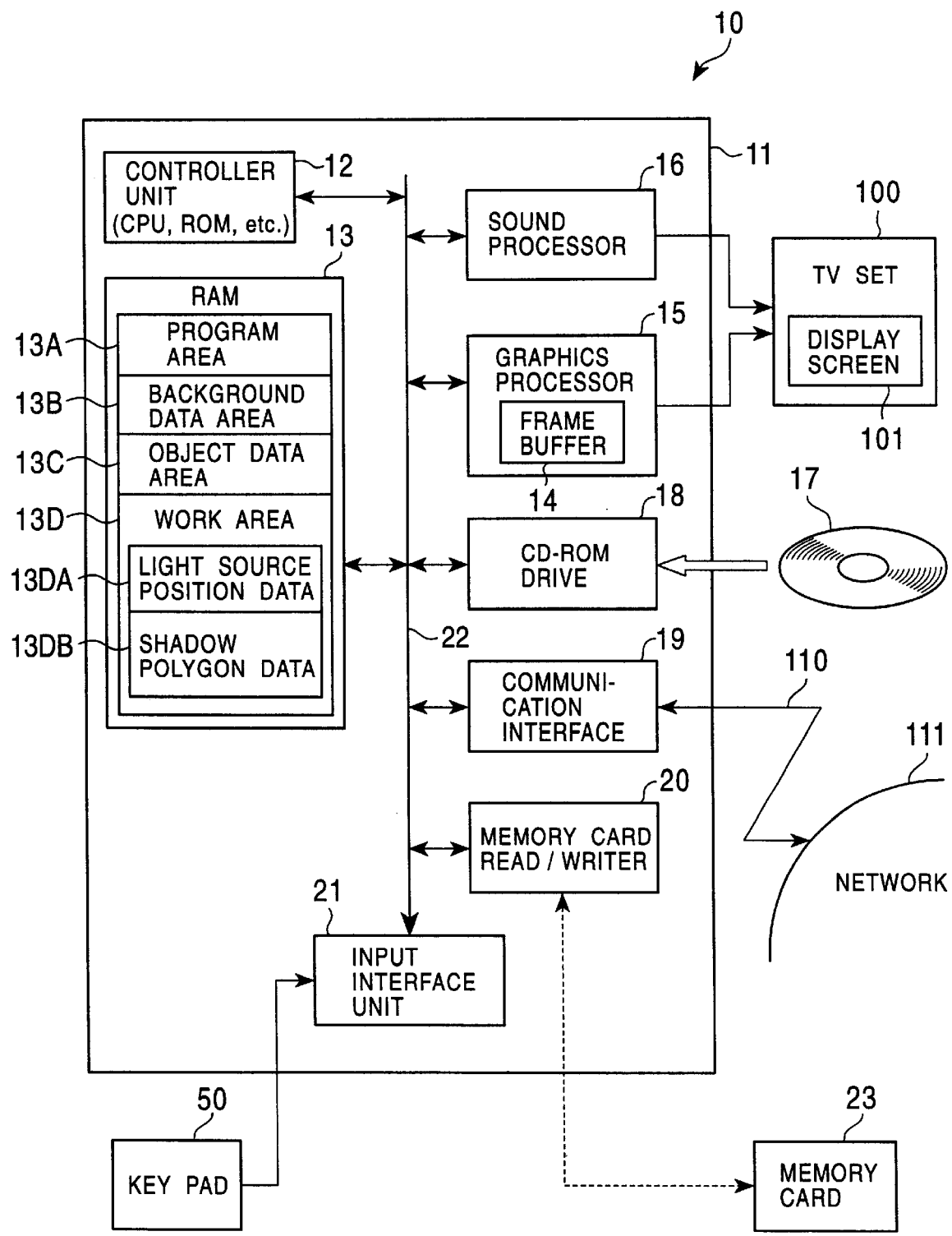
FIG. 1 is a block diagram illustrating an embodiment of the video game apparatus of the present invention.

FIG. 1 illustrates the video game apparatus of the invention. This video game apparatus executes a program stored in the computer-readable recording medium of the invention, and is used for performing the method of depicting a shadow image of the invention.

The video game apparatus 10 comprises a game apparatus main unit 11 and a keypad 50 connected to the input side of the game apparatus main unit 11. A television set 100 having a display unit 101 such as a CRT serving as a monitor with a speaker is connected to the output side of the game apparatus main unit 11. The keypad 50 is operated by a user (operator) and gives an operating instruction from the user to the game apparatus main unit 11. The television set 100 performs picture (image) display and sound output corresponding to the details of the game in response to video signals (image signals) and sound signals from the game apparatus main unit 11.

The game apparatus main unit 11 has a controller unit 12 comprising a CPU, a ROM, and the like; a RAM 13; a graphics processor 15 comprising a frame buffer 14 and generating a video signal on the basis of data stored in the frame buffer 14 in response to an instruction from the controller unit 12; a sound processor 16 generating a sound signal such as background music or acoustics in response to an instruction from the controller unit 12; a CD-ROM drive 18 reading out a game program, image data or sound data stored in a CD-ROM disk 17 serving as a storage medium; a communications interface unit 19 for conducting data communications with the other units, via selective connection to a network 111 through a communications line 110; a memory card read/writer 20 carrying out read/write of a memory card 23 storing save data such as game progress data and game environment setting data; an input interface unit 21 receiving input signals from the keypad 50; and a bus 22 mutually connecting these components.

The controller unit 12 executes the game program stored in a program area 13A of the RAM 13 described later.

The RAM 13 is partitioned into a program area 13A for storing the game program, a background data area 13B for storing background data of the game, an object data area 13C for storing object data, and a work area 13D for storing various data such as light source positional data and shadow polygon data generated during execution of the program. The game programming and image data are read out from the CD-ROM disk 17 by the CD-ROM drive 18 into relevant areas. The shadow depicting program in 3-D computer image processing in the invention is contained in the game programming read out from the CD-ROM disk 17.

The object data of game characters and the like stored in the object data area 13C are data based on polygon models. The object data are stored in the form of a polygon table 13CA storing, as shown in FIG. 2, object ID Nos. M1, M2 . . . , polygon ID Nos. P1, P2, . . . , for the individual object ID Nos. M1, M2 . . . , and vertex ID Nos. V1, V2, . . . , for the individual polygon ID Nos. P1, P2 . . . , and a vertex table 13 CB storing, as shown in FIG. 3, the object ID Nos. M1, M2 . . . , vertex ID Nos. V1, V2 . . . , for the individual object Nos. M1, M2 . . . , and coordinate data (X, Y and Z) forming pairs with the individual vertex ID Nos. V1, V2 . . . .

The shadow polygon data (shadow object data) 13DB are generated for each polygon on the basis of the light source data 13DA and the polygon data (polygon model), and are composed of, as shown in FIG. 4, a shadow ID No. SPn, the vertex ID No. SV1, SV2 and SV3, coordinate data (X, Y and Z) for the individual vertices, and α-values.

The α-value of a shadow polygon represents a degree of translucence with the lower seven bits of eight-bit data. When all seven lower bits of the α-value are "0", the value representing the degree of transparency is "0". If all seven lower bits of α-value are "1", then the value representing the degree of transparency is "1". With these seven lower bits of α-value, any of 128 gradations ranging from "0" indicating perfect transparency to "1" indicating perfect translucence can be taken. In order to draw a translucent shadow, an α-value representing the degree of translucence for a shadow polygon is set. In the example shown in FIG. 4, a value "40h" is set in a hexadecimal notation: in the case of an α-value of "40h", the degree of transparency takes a value of "0.5".

Figure 5:
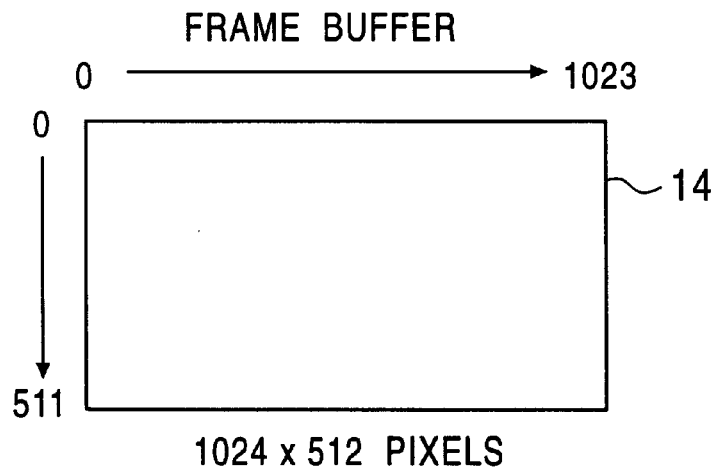
FIG. 5 is a descriptive view illustrating a typical configuration of the frame buffer.
Figure 6:
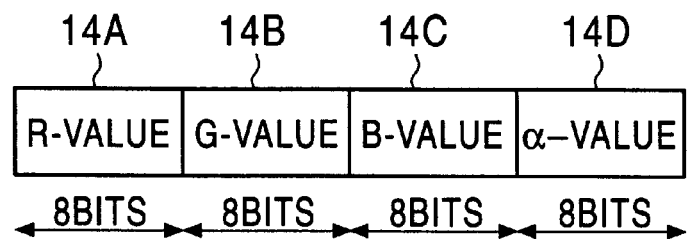
FIG. 6 is a descriptive view illustrating a typical format of pixel data used in the video game apparatus, the computer-readable recording medium and the method of depicting a shadow image of the invention.

The frame buffer 14 of the graphics processor 15 is composed, as shown in FIG. 5 for example, of 1024×512 pixels. The data format for each pixel comprises, as shown in FIG. 6, an R-value 14A, a G-value 14B, a B-value 14C and a destination α-value 14D. Data values reflected on the display screen are only (R, G and B).

Figure 7:
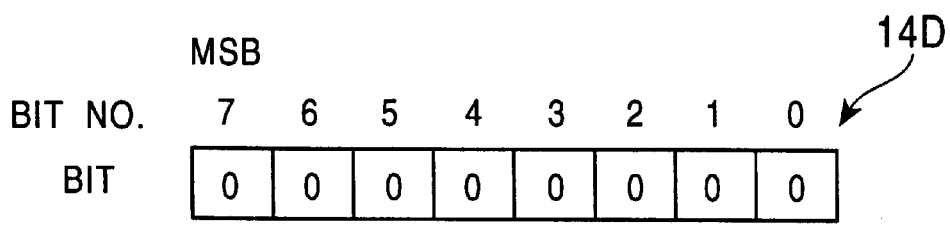
FIG. 7 is a descriptive view illustrating the bit configuration of α-value of pixel data.

As shown in FIG. 7, all of the bits of the initial value of destination α-value are "0", the seven lower bits of α-value for the shadow polygon are written as the seven lower bits. The highest bit (MSB) of the destination α-value 14D is used as a flag showing, for each pixel, whether or not the drawing process of the shadow object, i.e., the drawing process of a translucent shadow has already been accomplished. More specifically, the MSB is "0" if the drawing process of a translucent shadow is not actually conducted, and "1" is written in when the drawing process of a translucent shadow has been conducted.

Drawing of a translucent shadow can be accomplished by a drawing process known as the alpha-blending method. When the MSB of the destination α-value of the relevant pixel is "0", values of brightness including the R-value, the G-value and the B-value of the pixel in the frame buffer 14 in which other image data such as background image data have already been written are modified through calculation of the following formula:

$$C=\alpha A+(1-\alpha)B \quad (1)$$

where, A, B and C are data comprising values of brightness for the individual colors (R-value, G-value and B-value). Brightness is calculated for each of the colors R, G and B in Formula (1). The R-value, the G-value and the B-value represent brightness with a value within a range of from "0" to "1". The value of "0" corresponds to the darkest brightness, and "1", to the brightest one.

A represents the brightness of the pixel of a shadow polygon for writing to be written in; B, the brightness of the pixel for writing of the shadow polygon in the frame buffer; C, the brightness of the pixel after depiction of a translucent shadow; and a, data of the seven lowest bits of the α-value of the shadow polygon (showing the degree of translucence).

Upon drawing a translucent shadow, the MSB of the destination α-value of the relevant pixel is changed from "0" to "1". The pixel having an MSB of the destination α-value of "1" is therefore the pixel for which the drawing process of the translucent shadow has already been conducted. The drawing process of the translucent shadow as described above is not applied to this pixel, thus avoiding double drawing of the aforementioned translucent shadow, i.e., brightness modification in duplication.

Operations of the video game apparatus 10 having the above-mentioned configuration will now be described with reference to the flowcharts shown in FIGS. 8 to 11. The following steps of processing are carried out through execution of the program by the controller unit 12 of the game apparatus main unit 11.

Figure 8:
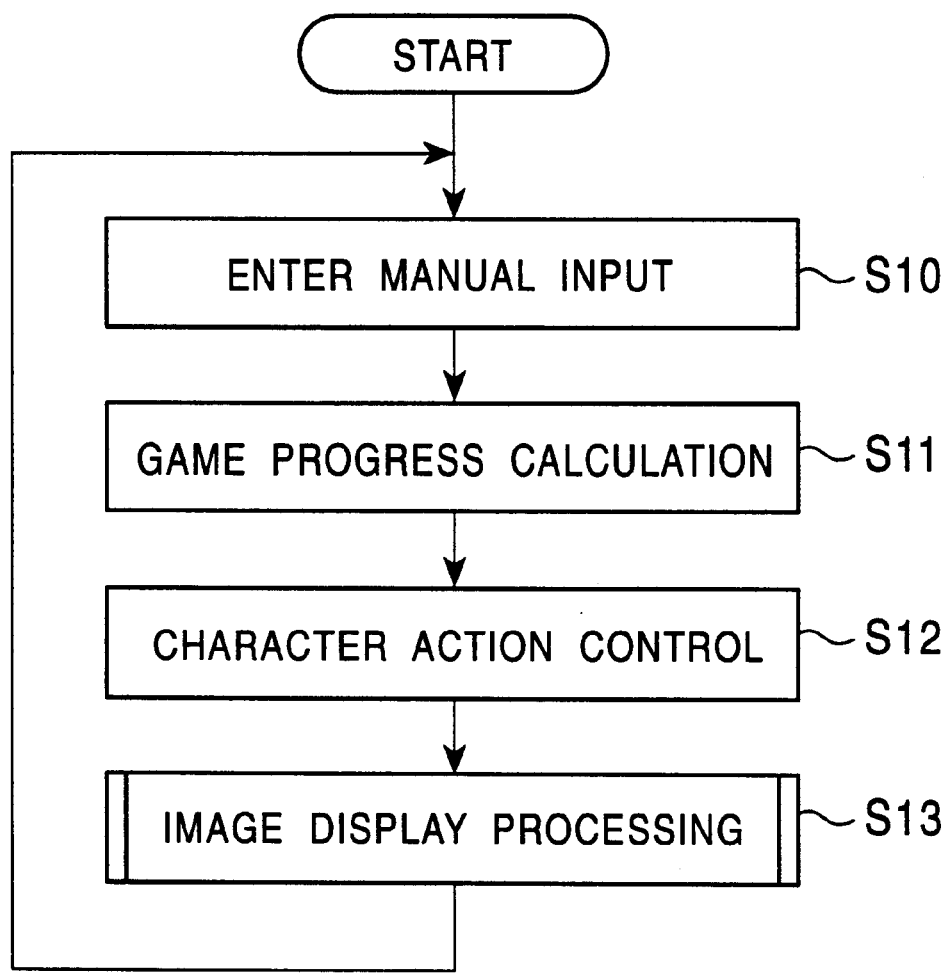
FIG. 8 is a flowchart illustrating the main flow used in the video game apparatus, the computer-readable recording medium and the method of depicting a shadow image of the invention.

FIG. 8 illustrates the main flow. In the main flow, a manual input from the key pad 50 is first received (step S10), followed by a prescribed game progress calculation in accordance with the game program in response to the manual input (step S11). Character actions are controlled on the basis of the result of the game progress calculation (step S12), followed by an image display processing (step S13).

Figure 9:
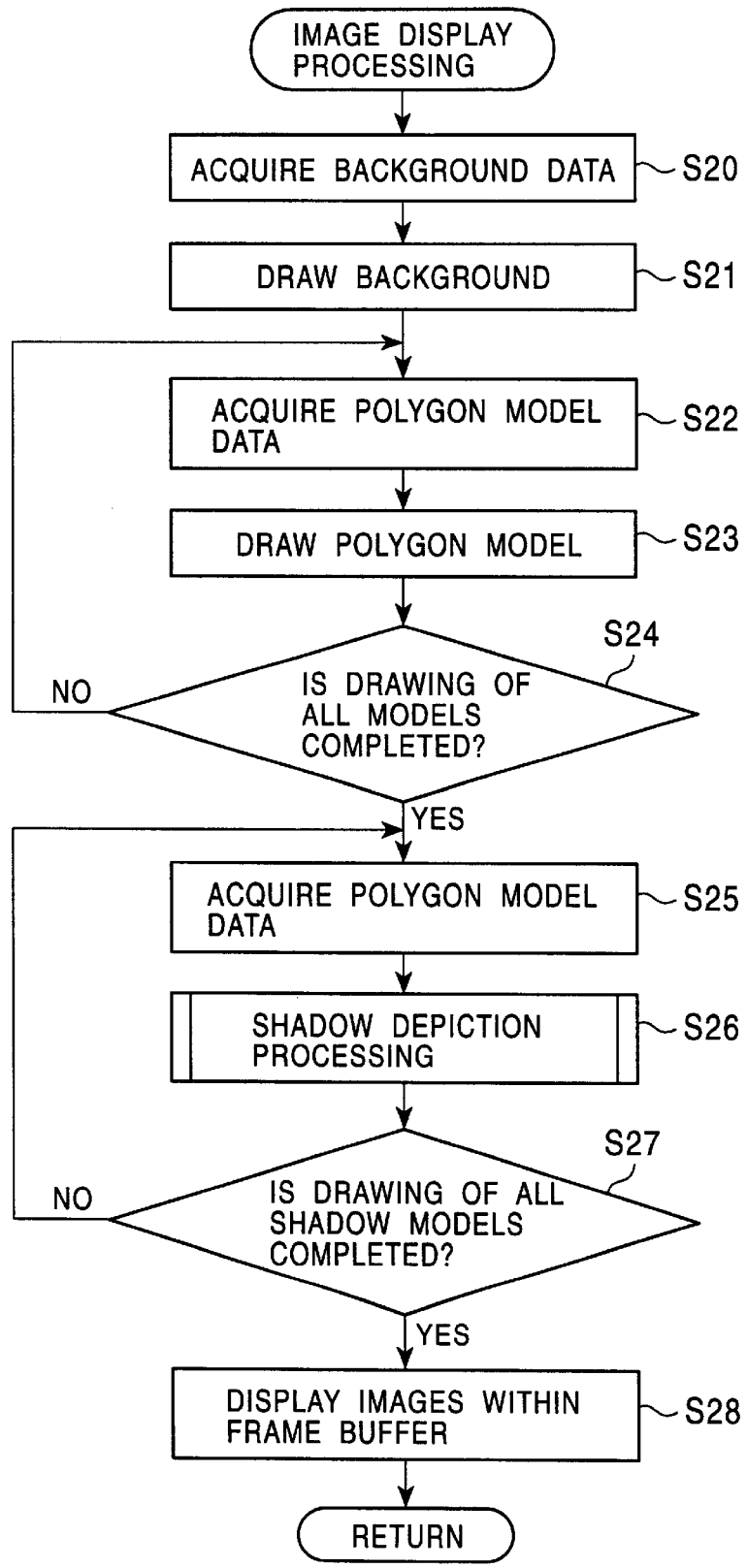
FIG. 9 is a flowchart illustrating the image processing flow in the video game apparatus, the computer-readable recording medium and the method of depicting a shadow image of the invention.

FIG. 9 illustrates the flow of image display process. In the flow of image display process, background data are first obtained from the background data area 13B of the RAM 13 (step S20). Perspective transformation and projection are carried out on the basis of the obtained background data, and data for drawing the background are written into the frame buffer (step S21). Then, data of the polygon models such as the game characters to be drawn are obtained from the object data area 13C of the RAM 13 (step S22). The obtained data of the polygon models are subjected to perspective transformation and projection for each polygon, and data for drawing the polygon model images are written in the frame buffer (step S23).

Step S22 and step S23 are repeatedly executed until the completion of drawing of all the models. Upon the completion of drawing of all the models (Yes in step S24), data of polygon models such as the game characters to be drawn are acquired again from the object data area 13C of the RAM 13 (step S25). Shadow drawing is carried out for each polygon model on the basis of the acquired polygon model data (step S26). Upon the completion of shadow drawing process of all the models (Yes in step S27), image display processing is performed with data of the frame buffer 14 (step S28).

Figure 10:
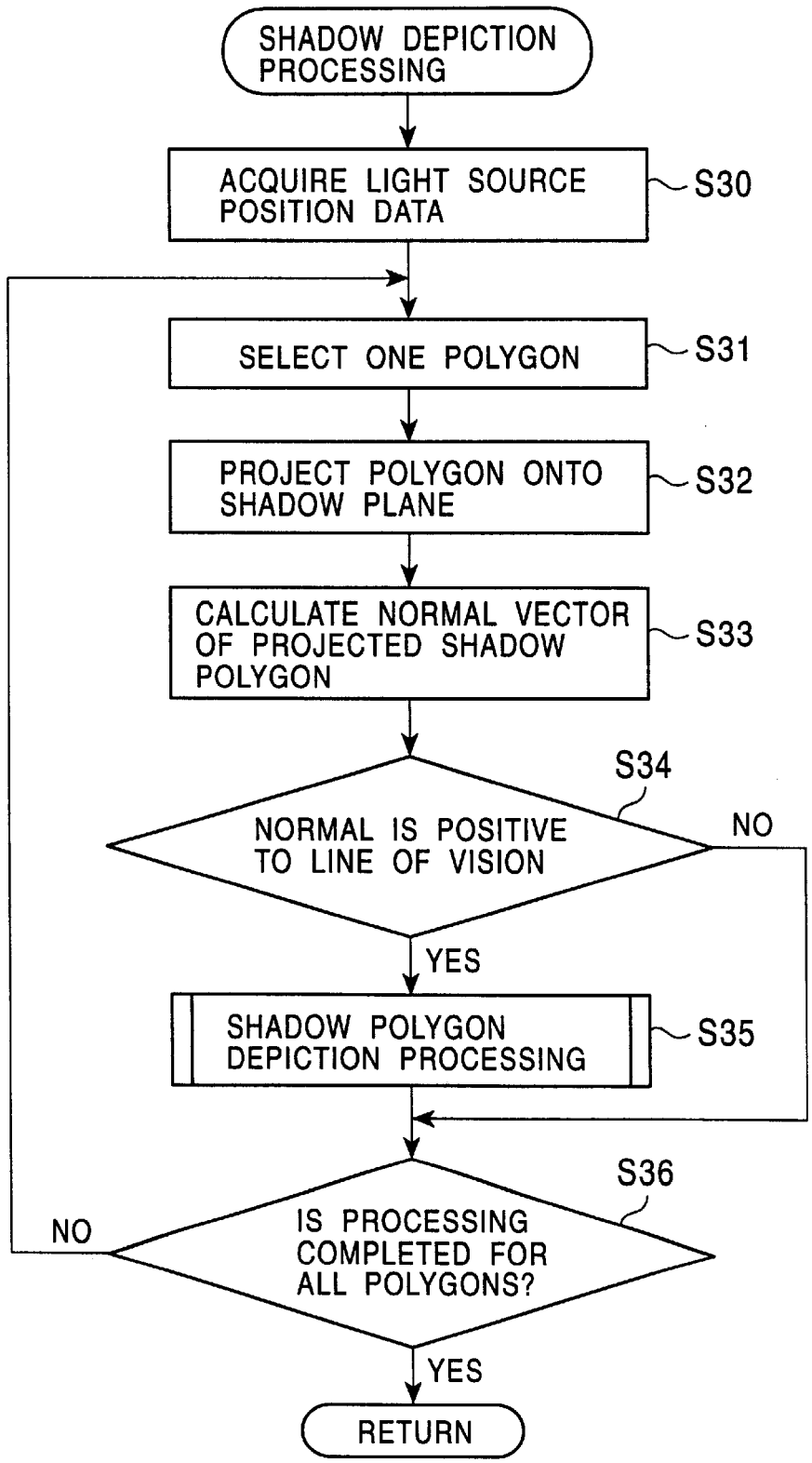
FIG. 10 is a flowchart illustrating the shadow image processing flow in the video game apparatus, the computer-readable recording medium and the method of depicting a shadow image of the invention.

FIG. 10 illustrates the shadow drawing flow. In the shadow drawing flow, light source positional data are first acquired from the work area of the RAM 13 (step S30). Then, one polygon is selected (step S31), and the selected polygon is projected onto the shadow plane, thus giving a shadow polygon (shadow object)(step S32). Then, the normal vector for the projected shadow polygon is calculated (step S33), and it is determined whether or not the calculated normal vector is in the positive direction relative to the line of vision, i.e., on the visible side (in a state in which the surface of the polygon is visible from the view point) (step S34). When the normal vector is in the positive direction relative to the line of vision, the drawing process of the shadow polygon is applied (step S35). Step S31 to step S35 are repeated until the completion of the process for all the polygons (Yes in step S36).

Figure 11:
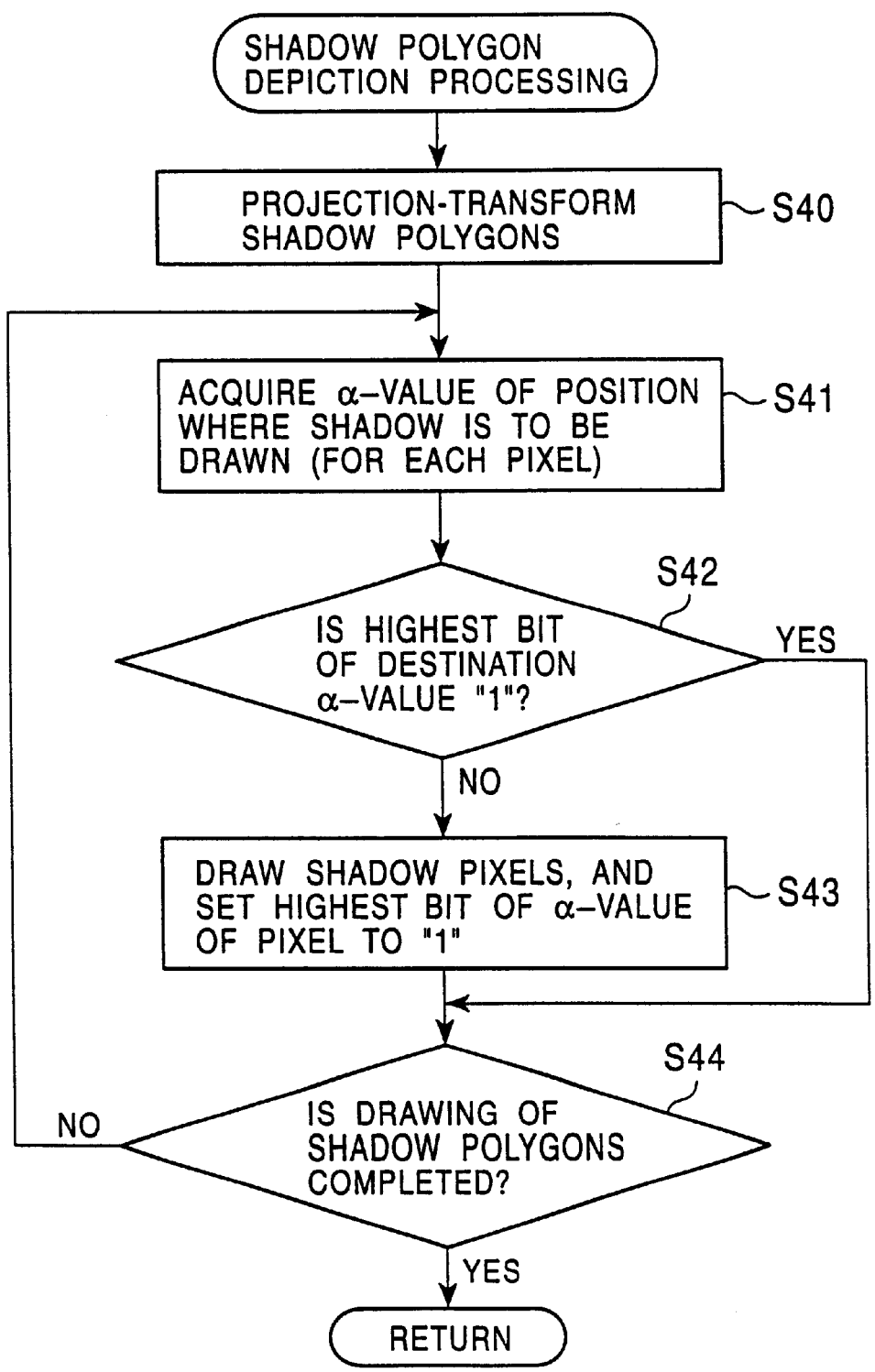
FIG. 11 is a flowchart illustrating the image processing flow of the shadow polygons in the video game apparatus, the computer-readable recording medium and the method of depicting a shadow image of the invention.

FIG. 11 illustrates the drawing process flow of a shadow polygon. In the drawing process flow for the shadow polygon, the shadow polygon is first subjected to perspective transformation and projection (step S40), and an α-value of the position at which a shadow is written is acquired for each pixel (step S41). Then, it is determined whether or not the highest bit (MSB) of the destination α-value of the pixel at the position for write of the shadow is "1" (step S42). If the MSB is not "1", a translucent shadow is drawn for that pixel. That is, a shadow pixel is written, and "1" is written in the highest bit (MSB) of the destination α-value for that pixel (step S43).

When the MSB is "1", in contrast, i.e., in an area where shadow polygons are superimposed, no further drawing process of a translucent shadow is conducted (step S43 is not executed). For an area determined to have shadow polygons superimposed therein, this means performing only one run of the drawing process of displaying only one of the superimposed shadow polygons. Step S41 to step S43 are repeated until the completion of drawing of all the shadow polygons (Yes in step S44).

Figure 12:
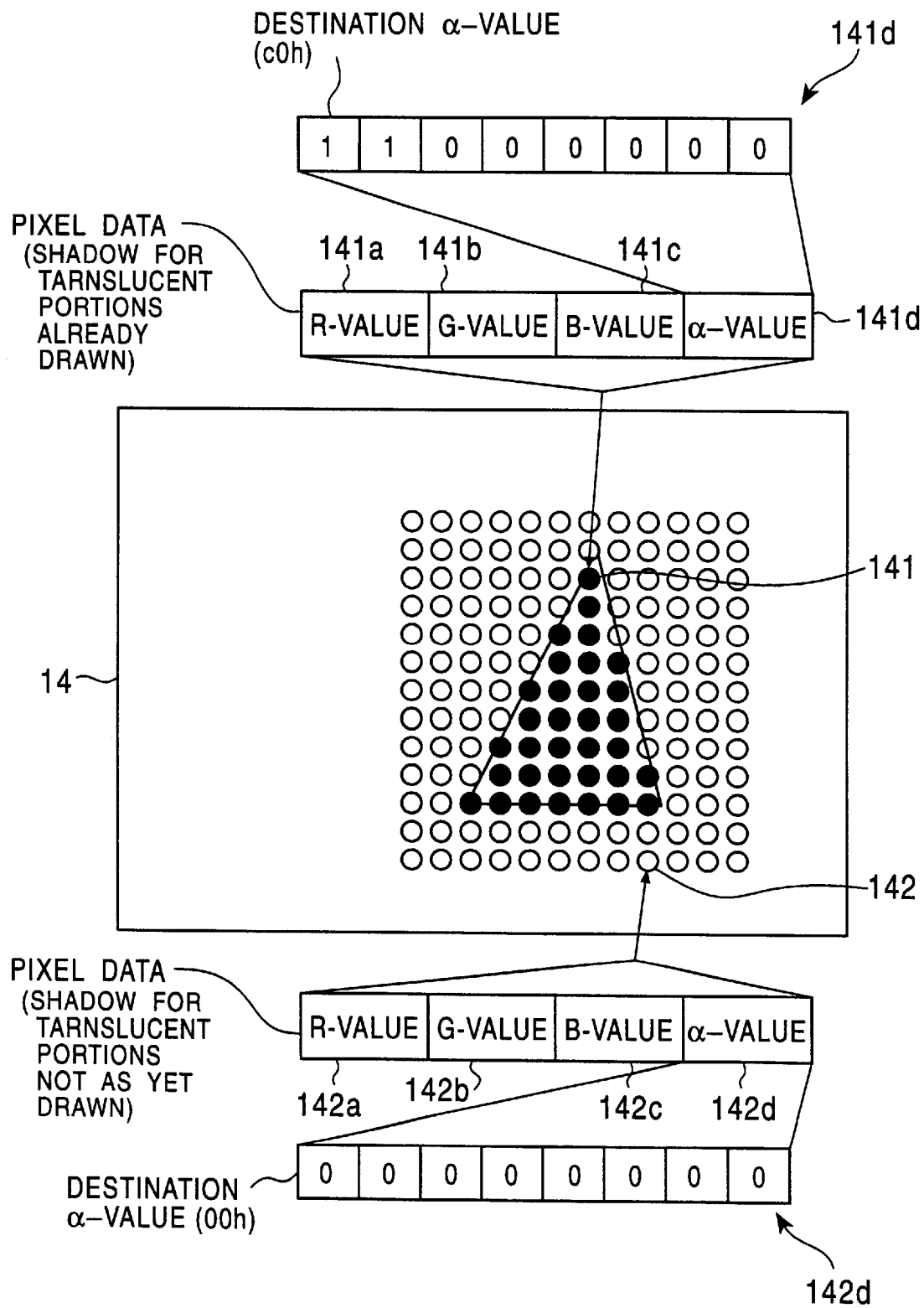
FIG. 12 is a descriptive view schematically illustrating the details of the frame buffer subjected to image processing of shadow polygons in the video game apparatus, the computer-readable recording medium, and the method of depicting a shadow image of the invention.

FIG. 12 schematically illustrates the details of the frame buffer in which the aforementioned shadow polygon drawing process has been performed. In FIG. 12, black circles ● represent pixels 141 for which the translucent shadow drawing process has been carried out, and white circles O, pixels 142 for which the translucent shadow drawing process has not been applied. Pixel data including R-values 141a and 142a, G-values 141b and 142b, B-values 141c and 142c, and destination α-values 141d and 142d are written in the pixels 141 and 142. Data showing translucence are written in the seven lower bits of the destination α-value of the pixel 141 for which the translucent shadow drawing process has been conducted, and the highest bit (MSB) of the destination α-value 141a is "1". The destination α-value 142d of the pixel 142 not subjected to the translucent shadow drawing process has a highest bit (MSB) of "0".

Figure 13A:
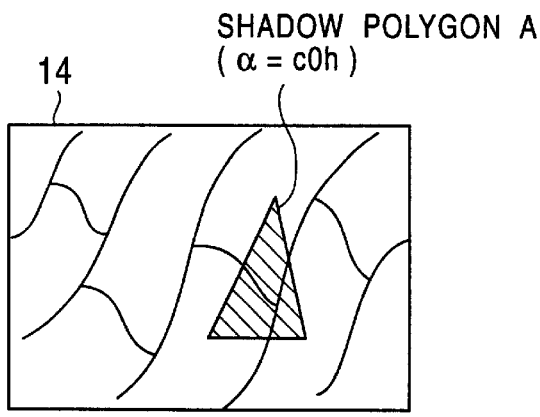
FIGS. 13A to 13C are descriptive views illustrating typical translucent shadow drawing where shadows are partly superimposed in the video game apparatus, the computer-readable recording medium and the method of depicting a shadow image of the invention.
Figure 13B:
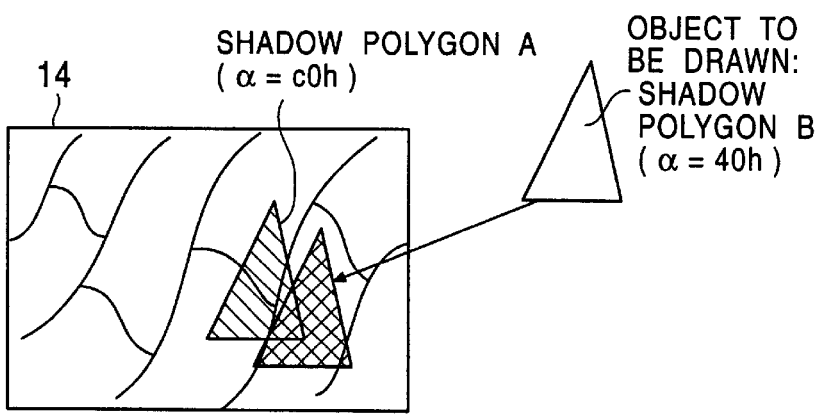
Figure 13C:
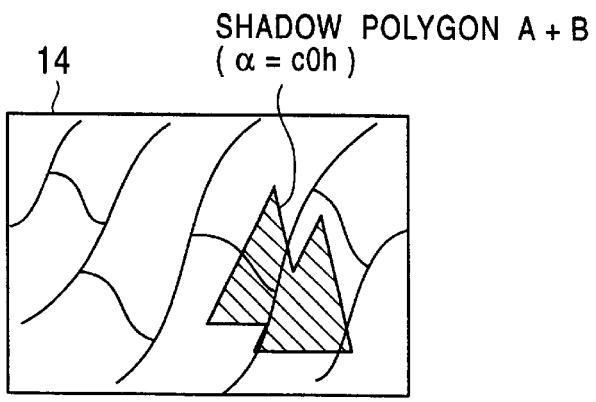

FIGS. 13A to 13C illustrate cases of a translucent shadow drawing process in which shadows are partly superimposed. As shown in FIG. 13A, when a shadow polygon A has already been drawn within the frame buffer 14, and a shadow polygon B containing a portion superimposed with the shadow polygon A is to be drawn, as shown in FIG. 13B, the translucent shadow drawing process is not applied again to the superimposed area with the shadow polygon A, and the translucent shadow drawing process is performed only for the portion of the shadow polygons A and B not superimposed (the cross-slashed portion in FIG. 13B), thus updating the destination α-value. This results in a shadow polygon A+B having a uniform brightness (uniform degree of translucence) as shown in FIG. 13C.

Figure 14:
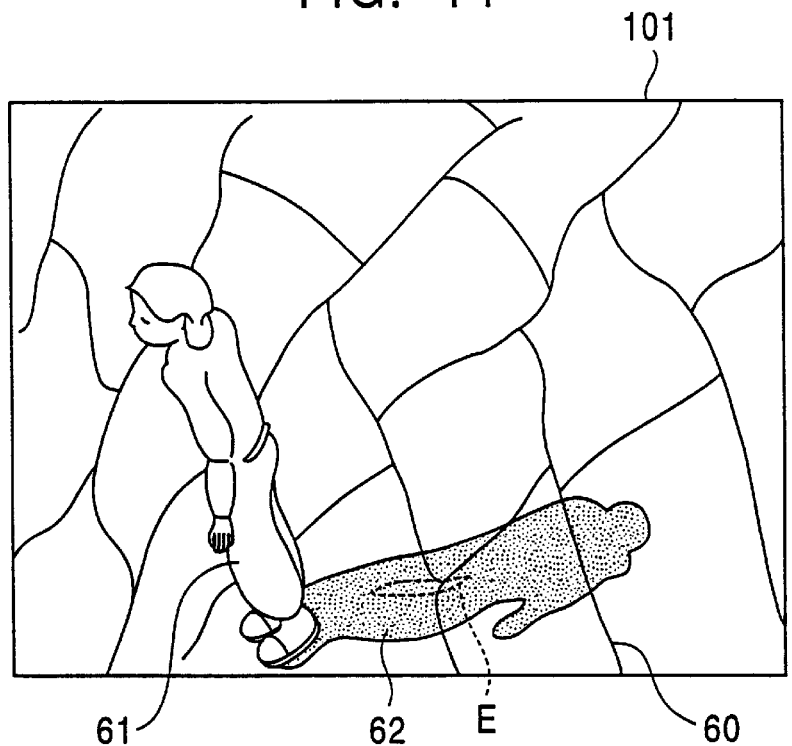
FIG. 14 is a descriptive view illustrating a typical translucent shadow drawing where shadows of the game characters are partly superimposed in the video game apparatus, the computer-readable recording medium and the method of depicting a shadow image of the invention.
Figure 15:
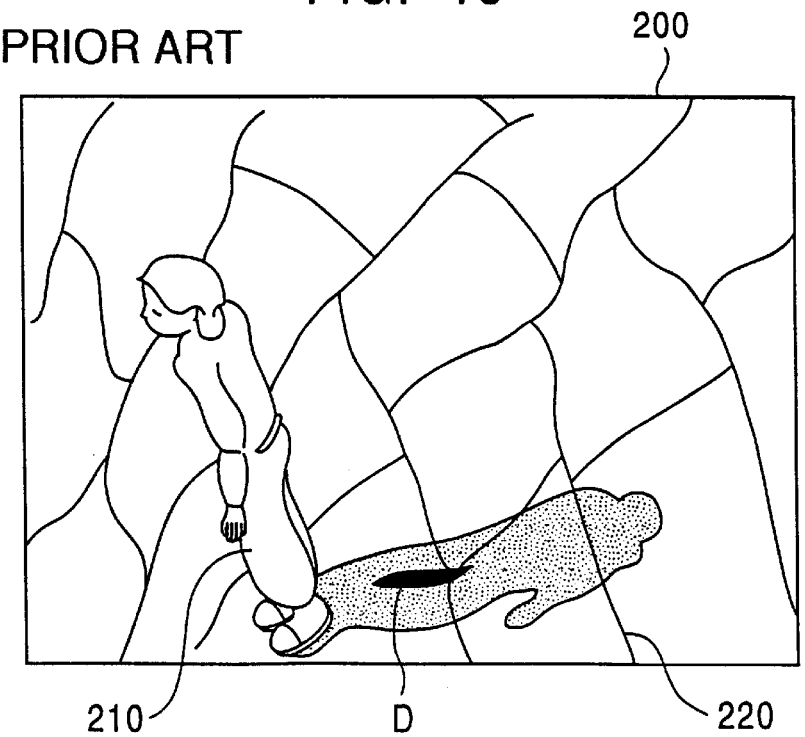
FIG. 15 is a descriptive view illustrating a typical translucent shadow drawing processing where shadows of the game characters are partly superimposed in a conventional method of depicting shadows.

FIG. 14 illustrates a typical display of the game character 61 for this case. A background 60 is displayed on a display screen 101, and the game character 61 is displayed in the form of a translucent image on the background 60. A shadow 62 of the game character 61 is displayed as a translucent image. In this example, the shadow of the game character as a whole is displayed with a uniform degree of translucence, irrespective of the presence of an region E where the shadow of polygon of the left leg of the game character is superimposed on the shadow of polygon of the right leg.

The shadow drawing process described in the aforementioned embodiment can be applied by executing a previously provided program on a personal computer or a video game apparatus. This shadow drawing program is recorded on a computer-readable recording medium such as a hard disk, a floppy disk, a CD-ROM, MO (magneto-optical disk) or a DVD, and is executed by reading it from the recording medium by a computer. The program can be distributed through a network such as the Internet via a recording medium as described above.

According to the computer-readable recording medium and the shadow depicting method of the present invention, as described above, for an area determined to have superimposed shadow objects, the drawing process is carried out by displaying only one of the superimposed shadow objects. It is therefore possible, even when the shadow images overlap each other on the background image, to realistically draw natural shadow images while preventing the shadow image from becoming darker in the superimposed area than in the other areas or preventing a decrease in the degree of translucence.

In the shadow object superimposition determining step, superimposition of shadow objects is determined with reference to a flag showing the presence or absence of a shadow object in correlation with the display position of the shadow object. It is therefore possible to easily draw a realistic natural shadow image by a simple processing technique while preventing the shadow image from becoming darker in the superimposed area than in the other areas or preventing a decrease in the degree of translucence. By setting such a flag for each pixel, it is possible to draw a translucent shadow image in detail with a sense of reality.

According to the video game apparatus of the invention, even when shadow images of game characters overlap each other on the background image, it is possible to draw a realistic natural shadow image while preventing the shadow image from becoming darker in the superimposed area than in the other areas or preventing a decrease in the degree of translucence.

What is claimed is:

1. A computer-readable recording medium storing a program for 3-D computer image processing which displays a shadow of a solid model drawn in a virtual 3-D space of a monitor screen as a shadow object, wherein said medium stores a program comprising:

a source code segment imparting a shadow object to each of the solid models to be drawn;

a source code segment determining whether multiple shadow objects are superimposed from a positional relationship between shadow objects imparted to the solid models to be drawn, the determination comprising setting a flag showing the presence of shadow objects in correlation with monitor screen positions of the shadow objects, and determining superimposition of the shadow objects with reference to the flag, one flag being associated with each area on the monitor screen; and a source code segment conducting drawing processing, for an area where there are superimposed shadow objects, which displays only one shadow object from among the superimposed shadow objects.

2. The computer-readable recording medium according to claim 1, wherein the determination of superimposition of said shadow objects comprises setting said flag for each pixel.

3. The computer-readable recording medium according to claim 1, wherein the shadow objects are displayed in a translucent manner.

4. A method of depicting a shadow in 3-D computer image processing which displays a shadow of a solid model drawn in a virtual 3-D space of a monitor screen as a shadow object, said method comprising:

imparting a shadow object to each of the solid models to be drawn;

determining whether there are multiple superimposed shadow objects from a positional relationship between shadow objects imparted to the solid models to be drawn, the determination of the superimposed shadow objects comprising setting a flag showing the presence of shadow objects in correlation with monitor screen positions of the shadow objects, and determining superimposition of the shadow objects with reference to the flag, one flag being associated with each area on the monitor screen; and conducting drawing processing, for an area where there are superimposed shadow objects, which displays only one shadow object from among the superimposed shadow objects.

5. The method of depicting a shadow in 3-D computer image processing according to claim 4, wherein the determination of said shadow objects comprises setting said flag for each pixel.

6. The method of depicting a shadow in 3-D computer image processing according to claim 4, wherein the shadow objects are displayed in a translucent manner.

7. A video game apparatus comprising:

a computer controlling a game; and a recording medium storing a program which causes said computer to control the game;

said program causing the computer to:

impart a shadow object to each of the solid models to be drawn;

determine whether there are multiple superimposed shadow objects from a positional relationship between shadow objects imparted to the solid models to be drawn, the determination of the superimposed shadow objects comprising setting a flag showing the presence of shadow objects in correlation with display screen positions of the shadow objects, and determining superimposition of the shadow objects with reference to the flag, one flag being associated with each area on the display screen; and conduct drawing processing, for an area where there are superimposed shadow objects, which displays only one shadow object from among the superimposed shadow objects.

* * * * *

UNITED STATES PATENT AND TRADEMARK OFFICE
CERTIFICATE OF CORRECTION

PATENT NO. : 6,771,265 B1
DATED : August 3, 2004
INVENTOR(S) : T. Shimono

It is certified that error appears in the above-identified patent and that said Letters Patent is hereby corrected as shown below:

Title page,
Item [56], References Cited, U.S. PATENT DOCUMENTS, include
-- 5,729,672   03/1998   Ashton, Martin --

Signed and Sealed this

Twenty-eighth Day of June, 2005

JON W. DUDAS
*Director of the United States Patent and Trademark Office*